United States Patent
Kivioja

(10) Patent No.: US 6,346,066 B1
(45) Date of Patent: *Feb. 12, 2002

(54) TUBULAR ROLL PROVIDED WITH HYDRAULICALLY LOADED GLIDE BEARINGS

(75) Inventor: Pekka Kivioja, Muurame (FI)

(73) Assignee: Valmet Corporation, Helsinki (FI)

( * ) Notice: Subject to any disclaimer, the term of this patent is extended or adjusted under 35 U.S.C. 154(b) by 0 days.

This patent is subject to a terminal disclaimer.

(21) Appl. No.: 09/091,719

(22) PCT Filed: Oct. 13, 1997

(86) PCT No.: PCT/FI97/00621

§ 371 Date: Jun. 19, 1998

§ 102(e) Date: Jun. 19, 1998

(87) PCT Pub. No.: WO98/17862

PCT Pub. Date: Apr. 30, 1998

(30) Foreign Application Priority Data

Oct. 23, 1996 (FI) .................................. 964262

(51) Int. Cl.⁷ ............................ B29C 43/46; D21G 1/02
(52) U.S. Cl. ................................ 492/7; 492/20; 492/10
(58) Field of Search .......................... 492/7, 10, 5, 20; 100/35, 47

(56) References Cited

U.S. PATENT DOCUMENTS

| | | | | |
|---|---|---|---|---|
| 4,852,229 A | * | 8/1989 | Crouse | 492/7 |
| 4,955,120 A | | 9/1990 | Brendel et al. | 29/113.2 |
| 4,970,767 A | | 11/1990 | Link | 29/116.2 |
| 5,060,357 A | | 10/1991 | Roerig et al. | 29/113.2 |
| 5,111,563 A | | 5/1992 | Brown et al. | 29/116.2 |
| 5,286,245 A | | 2/1994 | Schiel | 492/7 |
| 5,509,883 A | * | 4/1996 | Niskanen et al. | 492/20 |
| 5,566,451 A | * | 10/1996 | Niskanen et al. | 29/895.3 |
| 5,685,913 A | * | 11/1997 | Kivioja et al. | 492/7 |
| 5,743,839 A | * | 4/1998 | Niskanen | 492/20 |
| 5,860,903 A | * | 1/1999 | Niskanen | 492/20 |
| 5,909,917 A | * | 6/1999 | Kivioja et al. | 29/895.2 |
| 5,919,121 A | * | 7/1999 | Kusters et al. | 492/7 |
| 5,967,957 A | * | 10/1999 | Kusters | 492/7 |

FOREIGN PATENT DOCUMENTS

| | | | |
|---|---|---|---|
| DE | 1450002 | 4/1969 | |
| EP | 0332594 | 9/1989 | ........... D21G/1/02 |
| EP | 0451470 | 10/1991 | ........... F16C/13/00 |
| EP | 0672786 | 9/1995 | ........... D21G/1/02 |
| FI | 891860 | 10/1989 | ........... F16C/13/00 |
| FI | 891884 | 11/1989 | ........... F16C/13/00 |
| FI | 911541 | 10/1991 | ........... F16C/13/00 |
| FI | 923587 | 4/1993 | ........... F16C/13/00 |
| WO | 9509309 | 9/1994 | ........... F16C/13/00 |

* cited by examiner

Primary Examiner—S. Thomas Hughes
Assistant Examiner—Marc W. Butler
(74) Attorney, Agent, or Firm—Steinberg & Raskin, P.C.

(57) ABSTRACT

A tubular roll with glide bearings and a method for providing a tubular roll mantle with glide bearings. The roll mantle is supported on a roll axle by hydraulic glide bearing elements which are loaded hydraulically by a pressure medium. The roll is loaded from outside radially in a principal loading direction and the roll mantle is supported on the roll axle by glide bearing elements in the principal loading direction. The loading pressure and lubricant are fed to the glide bearing elements as separated from one another so that the movement of the roll mantle, the speed of movement and the change in speed are regulated by opening, closing and/or throttling the flow in the pressure duct of the loading pressure. The lubricant may be fed to the glide bearing elements irrespective of the loading pressure.

7 Claims, 4 Drawing Sheets

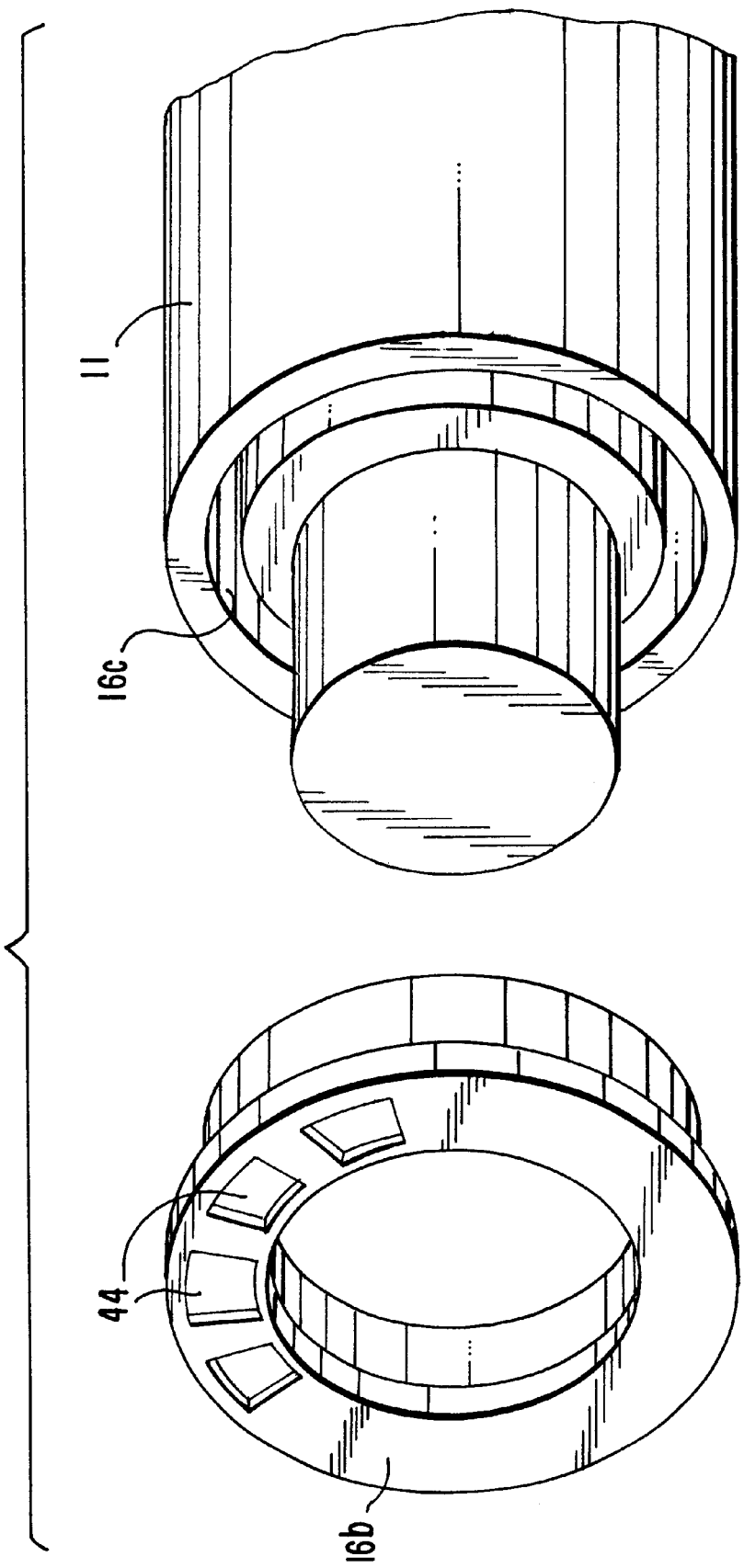

TUBULAR ROLL PROVIDED WITH HYDRAULICALLY LOADED GLIDE BEARINGS

FIELD OF THE INVENTION

The invention concerns a method for providing the tubular roll mantle of a roll in a paper machine or equivalent with glide bearings, in which method the roll mantle is supported on the stationary roll axle by means of hydraulic glide bearing elements acting upon the roll mantle or upon the roll ends, which glide bearing elements are loaded hydraulically by means of the pressure of a pressure medium, and which roll is loaded from outside radially at least in the direction of one plane, i.e. in the so-called principal loading direction, in which connection the roll mantle is supported on the roll axle by means of glide bearing elements acting radially in opposite directions substantially in the principal loading direction.

The invention also concerns a roll that is provided with glide bearings for a paper machine or equivalent and for carrying out the method, in which roll the roll mantle of the roll is supported revolvingly on the stationary roll axle by means of glide bearing elements acting upon the inner face of the roll mantle and/or upon the roll ends, which glide bearing elements are loaded by means of the pressure of a hydraulic pressure medium, and which roll is loaded from outside radially at least in the direction of one plane, i.e. in the so-called principal loading direction, in which connection the roll mantle is supported on the roll axle by means of glide bearing elements acting radially in opposite directions substantially in the principal loading direction.

BACKGROUND OF THE INVENTION

In the prior art, tubular rolls of paper machines were commonly journalled from the ends of the roll mantle by means of roller contact bearings on the roll axle. Such a conventional mode of journalling has its advantages, among other things that the journalling can be accomplished quite simply, and so far its costs have been considered to be relatively reasonable. Such a conventional mode of journalling, in which the roll mantle is mounted on the axle stationarily from its ends, is, however, not suitable for even nearly all applications of use in paper machines. In quite a number of cases, the roll mantle must have a possibility to move radially in relation to the roll axle, which property is quite often required, for example, from variable-crown rolls and from rolls adjustable in zones which are in nip contact with a backup roll. Besides the fact that, in a variable-crown roll, attempts are made to shape the roll mantle in a controlled way by means of the crown variation devices in particular in view of regulation of the profile of linear load, the roll ends must also be able to move in the radial direction in relation to the axle in order that the profile of linear load could also be controlled in the end areas of the roll. Besides the properties of profile regulation in the end areas, the regulation of the loading in the end areas of the roll also affects the control of the temperatures in the end areas.

Owing to what has been stated above, rolls have also been developed in which the whole roll mantle can move radially in the direction of loading in relation to the roll axle. Among other things, in the applicant's EP Patent No. 0,332,594 of earlier date, one such roll is described, in which the end bearings of the rolls have not been mounted directly on the central axle of the roll, but the bearings have been fitted on separate annular parts which can move radially in relation to the roll axle. The variable-crown roll in accordance with said EP patent is a nip roll, and the radial movement of the roll mantle is confined to the direction of the nip plane. The movement has been achieved so that hydraulic power units have been fitted between said annular parts and the roll axle, which power units shift the end bearings towards the nip or away from the nip by means of a hydraulic pressure medium. The principal object of said solution is opening and closing of the nip. There is also a great number of other rolls of similar type, which produce a substantially similar action while accomplished with a somewhat different technique.

The roller contact bearings in a roll produce quite considerable drawbacks and/or problems for the manufacture and operation of the roll. It is one substantial draw-back that roller contact bearings require machining of their own in the roll mantle.

Wear of the bearings may also result in problems, and roller contact bearings further impose their restrictions concerning the oil that can be used in the roll. It can be considered that a drawback of the conventional mode of journalling is at least the limitations of speed, because even now the speeds of rotation of rolls exceed the highest speeds permitted by bearing manufacturers, as well as the rolling accuracy, for, with the present technology, it is very difficult to improve the rolling accuracy of an assembled roll further. In a conventional roll, any defects are summed up in an assembled roll even if all the components, such as bearings, bearing housings, outer face of the mantle, etc. are machined as precisely as possible.

Journalling of the roll mantle with glide bearings is also known from the prior art. Such rolls with glide bearings are described, among other things, in the U.S. Pat. Nos. 5,060,357, and 5,111,563 and in the applicant's published EP Patent Application No. 0,672,786 of earlier date. In the roll in accordance with the U.S. Pat. No. 5,060,357, the roll mantle is provided with roller contact bearings fitted in the areas of its end pieces, which bearings are fitted on separate annular parts similar to those used in the above EP Patent No. 0,332,594. The roll is meant to be a nip roll, and its roll mantle can move in the direction of the nip plane in relation to the axle, among other things, in view of opening and closing the nip. The support of the roll mantle in the lateral direction, i.e. in the direction transverse to the nip plane, has been arranged by means of quite a complicated construction of glide bearings, by whose means attempts are made to make the movement of the roll mantle take place exactly in the direction of the nip plane. It is a drawback of the construction described in said U.S. patent exactly that it is complicated, among other things, with a number of glide faces and linkage arrangements, for which reason the reliability in operation, the controllability, and the dependability of the construction cannot be considered to be very good. It is a further problem in the solution of U.S. Pat. No. 5,060,357 that, by means of the equipment, it is impossible to compensate for any forces of transverse direction applied to the roll from outside, since such forces result in failure of the oil film between the glide shoes and the inner face of the roll mantle.

In the U.S. Pat. No. 5,111,563, an arrangement of support of a roll with glide bearings in the lateral direction is described which is simpler than the solution of the U.S. patent mentioned above. In this solution, the journalling with glide bearings in the lateral direction has, however, been accomplished with a linkage arrangement which cannot compensate for lateral forces applied to the roll from outside either.

In the applicant's earlier EP Patent Application (application publication No. 0,672,786), a number of alternative solutions for providing a roll with glide bearings are described, by means of which solutions a considerable improvement is provided over the U.S. patents mentioned earlier. Even though the operation of the roll described in the EP publication No. 0,672,786 has proved good and reliable, it has been a problem that the construction described in said EP publication is somewhat complicated, and it is desirable to simplify this construction so that the simplification of the construction also results in improvement of the reliability of operation. It is a particular objective to completely abandon the regulation device described in the EP publication, by means of which device the vertical movements, i.e. the movements of the roll mantle in the principal loading direction, in particular in the direction of the nip plane, are controlled. In particular in solutions in which said roll is used as a roll of a supercalender, in certain situations it is somewhat problematic to be able to keep the roll in the desired state and position even if the hydraulic system had been switched off completely. It is in particular desirable also to provide an improvement for such a solution.

OBJECTS AND SUMMARY OF THE INVENTION

The object of the present invention is to provide a novel method for providing the tubular roll mantle of a roll of a paper machine or equivalent with glide bearings as well as to provide a roll fitted with guide bearings by whose means drawbacks involved in the prior art are avoided, and by means of which method and roll, at the same time, a substantial improvement is achieved over existing constructions and methods.

In view of achieving the objectives of the invention, the method in accordance with the invention is mainly characterized in that, to the glide bearing elements acting in the principal loading direction in opposite directions, the loading pressure and the lubricant are fed as separated from one another so that, when the roll mantle is allowed to be displaced over a certain distance in the principal loading direction, the movement of the roll mantle, the speed of movement, and the change in the speed are regulated by opening, closing, and/or throttling the flow in the pressure duct of the loading pressure, in which connection the lubricant can be fed without interruption with the desired pressure and flow rate to the glide bearing elements irrespective of the loading pressure and of the position of the roll mantle.

On the other hand, the roll in accordance with the invention provided with glide bearings is mainly characterized in that the feed of the hydraulic loading pressure to the glide bearing elements acting in opposite directions in the principal loading direction is substantially completely separated from the supply of lubricant passing to said glide bearing elements, so that, for the feed of the loading pressure, there is a pressure duct of its own, and for the feed of the lubricant there is a separate lubricant duct, in which connection a certain maximal movement of shifting is permitted for the roll mantle in the principal loading direction, and said movement of the roll mantle, the speed of movement, and the change in the speed have been arranged to be regulated by opening, closing, and/or throttling the flow in the pressure duct of said loading pressure, and in which connection the lubricant can be fed with the desired pressure and flow rate to the glide bearing elements irrespective of the loading pressure and of the position of the roll mantle.

By means of the present invention, a number of remarkable advantages are achieved over the prior art, and of these advantages, among other things, the following should be mentioned in this connection. First, in the solution in accordance with the present invention, the mode of journalling is considerably simpler than in the prior art, for no separate regulation device for controlling the movements of the roll mantle is needed in the solution of the present invention. In the invention, the journalling, of the roll mantle with slide bearings has been accomplished so that the roll mantle can be locked in the desired position even if the hydraulic system had been switched off. Further, in the present invention, the quantity of lubricant passing through the glide bearing elements can be regulated, and thus, the oil flow passing through the elements can be used, for example, for cooling the end areas of the roll or for any other regulation of temperature. Further, as was already stated above, the mode of carrying out the invention is very simple and, consequently, reliable in operation. The further advantages and characteristic features of the invention will come out from the following detailed description of the invention.

BRIEF DESCRIPTION OF THE DRAWINGS

In the following, the invention will be described by way of example with reference to the figures in the accompanying drawing.

FIG. 2A is a schematic perspective view illustrating an exemplifying embodiment of a preferred construction of axial support.

DETAILED DESCRIPTION OF THE PREFERRED EMBODIMENTS

Figure 1:
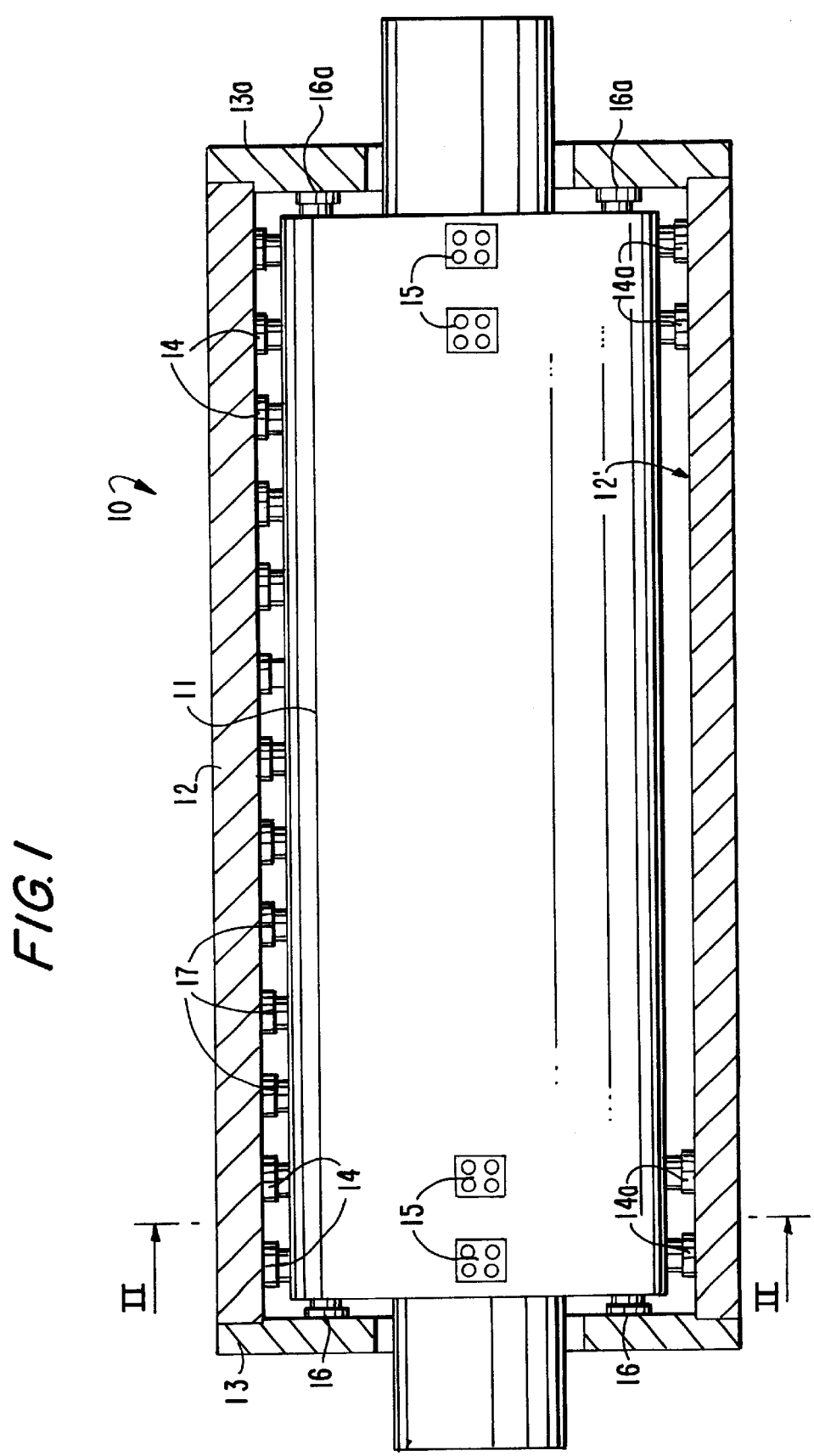
FIG. 1 is a fully schematic sectional side view of a roll provided with glide bearings in accordance with the invention, which roll is, in the exemplifying embodiment shown in FIG. 1. a variable-crown roll preferably adjustable in zones.
Figure 2:
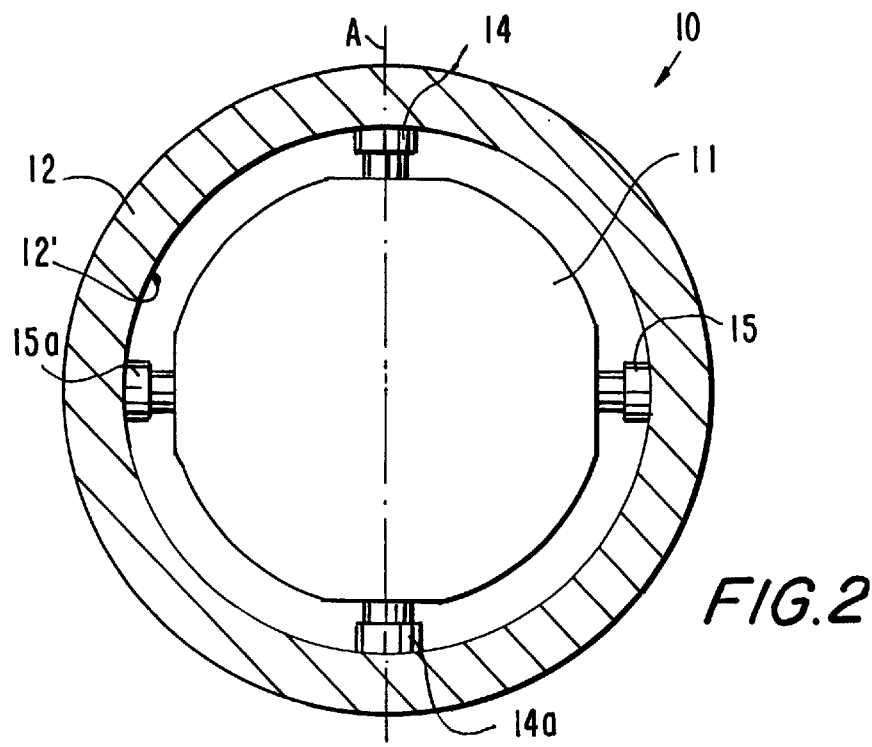
FIG. 2 is a schematic sectional view taken alone the line II—II in FIG. 1.

Thus, FIGS. 1 and 2 are fully schematic sectional views of a tubular roll with glide bearings in accordance with the invention so that FIG. 1 is a sectional view of the roll in the axial vertical plane, and FIG. 2 is a sectional view of the roll of FIG. 1 taken along the line II—II in FIG. 1. In FIGS. 1 and 2 the roll is denoted generally with the reference numeral 10, and in these embodiments the roll 10 is a variable-crown roll, preferably adjustable in zones, which roll comprises a stationary roll axle 11, on which the tubular roll mantle 12 has been fitted revolvingly, which roll mantle is supported on the roll axle by means of hydraulic loading elements 17. The hydraulic loading elements 17 act in the so-called principal loading direction, i.e. in the direction of the nip plane, and by means of said elements it is possible to adjust the shape of the roll mantle 12 and to control the axial nip profile of the roll.

The roll 10 shown in FIGS. 1 and 2 is a roll exclusively provided with glide bearings, so that the roll 10 has no conventional roller contact bearings fitted at the roll ends at all. The journalling of the roll 10 has been accomplished by means of glide bearing elements 14a of which the glide bearing elements that act in the loading direction, in the case of the roll shown in FIGS. 1 and 2 in the direction of the nip plane, are denoted with the reference numerals 14 and 14a. The first glide bearing elements 14 act in the direction of the nip, i.e. against the loading, and the second glide bearing elements 14a act in the opposite direction. In the exemplifying embodiment shown in FIGS. 1 and 2, it is shown further that the roll 10 is also provided with glide bearing elements 15,15a acting in the direction transverse to the loading direction, which elements act in opposite directions. Since the roll 10 is a roll exclusively provided with glide bearings, it is also provided with glide bearing elements 16,16a acting in the axial direction in opposite directions, which elements 16,16a are supported by the intermediate of an oil film against the roll ends 13,13a. As is shown in FIGS. 1 and 2, the glide bearing elements 14,15,14a, 15a acting in the radial direction are supported against the inner face 12' of the roll mantle 12 by the intermediate of an oil film. In the illustration in FIG. 1, the glide bearing elements 14,14a,15, 15a that act in the radial direction have been arranged in pairs, so that there are two pieces of each glide bearing element, which have been fitted side by side in the axial direction. From the point of view of the operation, such an arrangement is, however, not an indispensable requirement, for the journalling can also be accomplished, for example, by means of single glide-bearing elements alone, or by means of several glide bearing elements fitted side by side.

On the other hand, in FIG. 2 it is shown that the glide bearing elements 14,14a, 15,15a have been arranged to act in the direction of loading and in the direction transverse to said loading direction. However, there may also be a higher number of glide bearing elements fitted to act radially in different angular positions. One such alternative embodiment is illustrated in FIG. 3.

Figure 3:
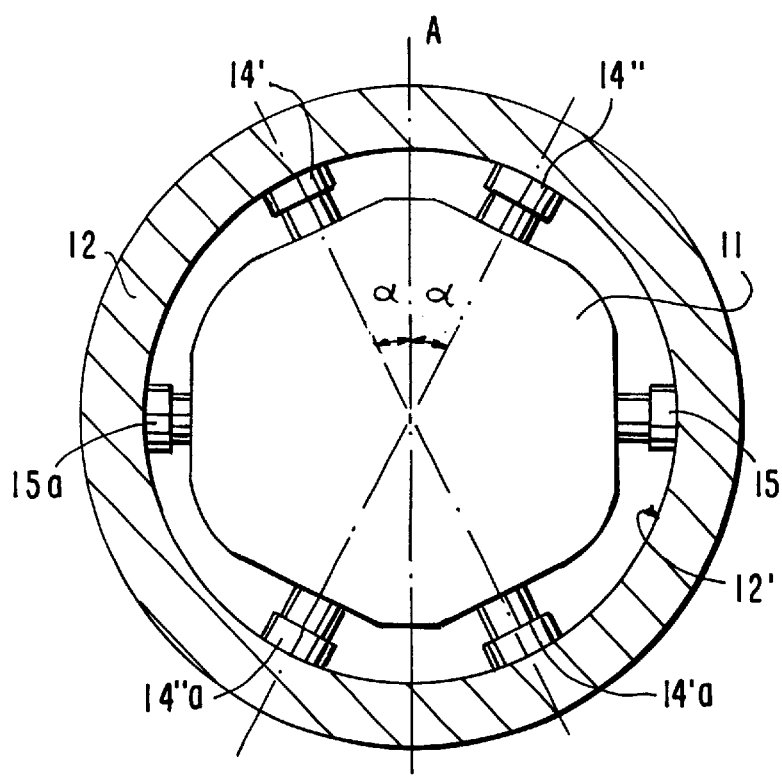
FIG. 3 is an illustration corresponding to FIG. 2 of a solution alternative to the embodiment shown in FIG. 2.

Thus, said FIG. 3 illustrates a case in which the support of the roll mantle 12 in the transverse direction has been arranged in a way similar to that described in relation to FIG. 2, i.e. by means of glide bearing elements 15,15a acting in opposite directions. In stead, the supporting of the roll mantle 12 in the principal loading direction, i.e. in the direction of the nip plane A, has been accomplished so that, in the solution shown in FIG. 3, glide bearing elements 14',14";14'a,14"a are employed, which do not act directly in the principal loading direction A but are diverted from said direction by the angle a in opposite directions. The solution shown in FIG. 3 is advantageous in particular in the respect that by means of said solution a force is achieved that is higher than with the construction shown in FIG. 2, because the resultant of the forces of the glide bearing elements 14',14" and 14'a,14"a, respectively, acts in the principal loading direction A. In all other respects, the embodiment shown in FIG. 3 is similar to that described above, In respect of the axial glide bearing elements, it can be stated further that, differing from FIG. 1, the axial movements of the roll mantle 12 can be controlled by means of single glide bearing elements 16,16a alone, acting in the same plane in opposite directions. On the other hand, there may also be several such axial glide bearing elements 16,16a, which are, for example, uniformly spaced and divided so as to act upon the inner faces of the roll ends 13,13a. FIG. 2A shows a further, more advantageous embodiment of axial glide bearing elements. According to this embodiment, the axial glide bearing elements 16b are annular glide bearings, into whose support face, which rests against the roll end 13,13a, oil pockets 44 have been formed. Similarly, in the exemplifying embodiment shown in this figure, an annular groove 16c has been formed into the roll axle 11, into which groove the "piston part" of the glide bearing element 16b has been fitted. The axial support can also be arranged so that glide bearing elements 16b are supported from opposite sides against the same roll end 13, in which case axial glide bearings are not needed at the opposite end of the roll.

Figure 4:
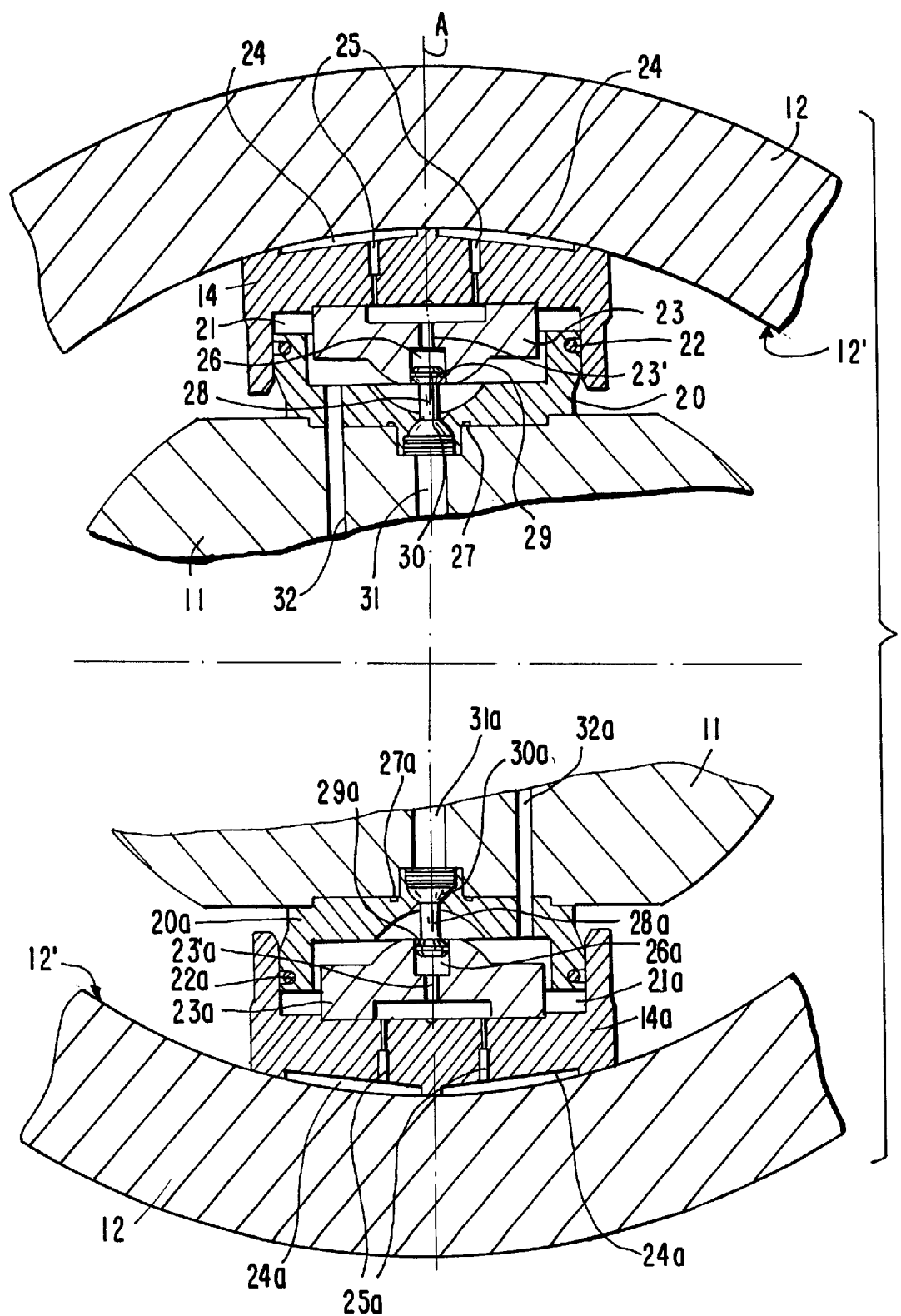
FIG. 4 is a more detailed and partly sectional illustration of the support of the roll mantle and of the control of the movements of the roll mantle in the so-called principal loading direction when accomplished in accordance with the invention.

FIG. 4 is a schematic and partly sectional illustration of the support of the roll mantle in the so-called principal loading direction, i.e., in the case of the variable-crown roll 10 adjustable in zones shown in FIG. 1, in the direction of the nip plane. In FIG. 4 the nip plane is denoted with the reference denotation A. Also in this FIG. 4 which is being discussed now, the roll axle is denoted with the reference numeral 11 and the roll mantle with the rereference numeral 12, In the following, to begin with, the construction of the support arrangement shown in FIG. 4 will be described, and after that the operation of the support arrangement will be described.

The roll mantle 12 is supported by means of glide bearing elements 14, 14a loaded against the inner face 12' of the roll mantle, which bearing elements act, in the embodiment shown in FIG. 4, in opposite directions so that the first glide bearing element 14 loads the roll mantle 12 towards an outside load applied to the roll mantle, i.e. in the case shown in FIG. 1, towards the nip, and the other glide bearing element 14a loads the roll mantle similarly in the opposite direction. Thus, in the case of FIG. 4, the glide bearing elements 14,14a have been arranged in the nip plane A to act in opposite directions. The glide bearing elements 14,14a are provided with cavity spaces 21,21a that can be pressurized, and for each glide bearing element 14,14a frame pieces 20,20a have been mounted in the roll axle 11, which pieces penetrate into the cavity spaces 21,21a in said glide bearing elements, in relation to which cavity spaces the frame pieces 20,20a have been sealed by means of seals 22,22a so that the glide bearing elements 14,14a can move in relation to the frame pieces 20,20a in the radial direction of the roll. Moreover, the frame pieces 20,20a have been shaped so that the glide bearing elements 14,14a can be inclined in relation to the frame pieces 20,20a.

As regards their construction, the glide bearing elements 14, 14a are in the respect conventional that their outer faces are provided with oil pockets 24,24a, into which lubrication oil or an equivalent oil material is fed through capillary bores 25,25a passing through the glide bearing elements 14,14a. To the bottoms of the cavity spaces 21,21a in the glide bearing elements 14,14a, bottom pieces 23,23a have been attached by means of purposeful fastening means (not shown). Thus, the bottom pieces 23,23a move along with the glide bearing elements 14,14a so that, in relation to the frame pieces 20,20a, they can both be inclined and move in the radial direction of the roll. Into the bottom pieces 23,23a, into the side placed facing the frame pieces 20,20a, i.e. inwards in the radial direction, cylindrical recesses 26,26a have been formed, and further, into the bottom pieces 23,23a, bores 23',23'a have been formed which communicate with said recesses 26,26a and pass through the bottom pieces 23,23a. The lubricant is passed through said recesses 26,26a and bores 23',23'a into the capillary bores 25,25a and from them further into the oil pockets 24,24a.

In a roll with glide bearings in accordance with the invention, the lubrication and loading of the glide bearing elements 14,14a have been separated from one another. The pressure medium intended for loading of the glide bearing elements 14,14a is passed into the cavity spaces 21,21a in the glide bearing elements through particular pressure ducts 32,32a. Thus pressure ducts 33,32a act as first duct means passing a pressure medium to the glide bearing elements. On the other hand, for the supply of the lubricant intended for lubrication between the glide bearing elements 14,14a and the inner face 12' of the roll mantle there are lubricant ducts 31,31a of their own. Thus lubricant ducts 31,31a act as second duct means for passing a flow of lubricant to the glide bearing elements. The lubricant ducts 31,31*a* communicate with the glide bearing elements 14,14*a* through the ducts 28,28*a*. The duct 28,28*a* is a tubular member, in whose end placed next to the axle 11 there is a spherical articulation member 30,30*a*, by whose means the duct 28,28*a* has been mounted on the roll axle 11 so that it is articulated and sealed, in the case illustrated in FIG. 4 between the axle 11 and the frame piece 20,20*a* so that the duct 28,28*a* can be inclined freely in the way required by the inclining of the glide bearing elements 14,14*a*. Further, in the case shown in FIG. 4, a "socket" has been formed into the frame piece 20,20*a* for the spherical articulation member 30,30*a*, in which socket said articulation member can pivot, and further the frame piece 20,20*a* has been sealed by means of a seal 27,27*a* in relation to the roll axle 11. At the opposite end of the duct 28,28*a*, i.e. at the end placed next to the glide bearing element 14,14*a*, there is a piston member 29,29*a*, which has been fitted in the cylindrical recess 26,26*a* formed in the bottom piece 23,23*a* so that, when the glide bearing element 14,14*a* moves in the radial direction, the piston member 29,29*a* moves in the cylindrical recess 26,26*a*. Moreover, the piston member 29,29*a* has been shaped so that said piston member 29,29*a* and the cylindrical recess 26,26*a* can be inclined in relation to one another. Further, the piston member 29,29*a* is provided with a seal passing around the piston member, which seal is sealed against the wall of the cylindrical recess 26,26*a*. Thus, the supply of the lubricant to the glide bearing elements 14,14*a* is completely separated from the supply of the pressure medium.

By means of the construction in accordance with the invention, a controlled and precise regulation of the position of the roll mantle 12 in the direction of the nip plane A is achieved. This is highly significant, for example, in connection with rolls of supercalenders, because during the operation of a supercalender situations occur in which it must be possible to keep the roll in the desired position even if the loading pressure of the stack of rolls had been switched off. Such situations may occur, for example, during web breaks in connection with instantaneous opening. In a case in accordance with the present invention, this can be arranged simply by opening and closing the flow in the pressure duct 32,32*a*. In such situations, it is not necessary to interfere with the supply of lubricant at all, in which case the lubrication between the glide bearing elements 14,14*a* and the inner face 12' of the roll mantle is ensured under all circumstances. A significant advantage is achieved further by means of the solution in accordance with the invention in the respect that the pressure of the lubricant passing to the glide bearing elements 14,14*a* can be arranged adjustable, in which case, by means of said regulation of the lubricant pressure, it is possible to regulate the flow passing through the glide bearing elements 14,14*a*. This property can be utilized in the regulation of the temperature in the roll mantle 12, and in particular in the end areas of the roll mantle. In a number of cases, it is necessary to be able to cool exactly said end areas during operation, and in the solution in accordance with the present invention this takes place simply by regulating the pressure of the lubricant. The regulation of the pressure of the lubricant can be arranged to be common of all the glide bearing elements 14,14*a* in the nip plane A. On the other hand, the regulation of the lubricant pressure can be arranged separately and individually for each glide bearing element 14,14*a* in the nip plane, and also for the hydraulic loading elements 17 proper if a corresponding construction is used in these, in which case the axial temperature profile in the roll can be affected by means of such a possibility of regulation. The regulation of the of the lubricant pressure can be achieved as discussed above by any conventional method, such as a suitable throttle or the like.

As was stated earlier in connection with nip rolls, it must be possible to shift the roll mantle quickly in the direction of the nip plane, for example, when the nip is opened (and also when it is closed). Earlier, such quick opening of the nip has been controlled, among other things, so that a separate braking pressure has been passed into the glide bearing elements, by whose means, for example in a situation of opening of the nip, it has been possible to stop the glide bearing elements in the desired position in a controlled way even if the loading pressures had been switched off completely. In the solution of the present invention, no such separate braking pressure is needed at all any longer, but the movements of the glide bearing elements 14,14*a* and of the roll mantle 12 have been arranged exclusively by regulating the flow in the pressure duct, for example, by means of a suitable throttle. Lubrication has been ensured also in all such situations, because the supply of lubricant need not be switched off.

Above, the invention has been described by way of example with reference to the figures in the accompanying drawing. The invention is, however, not confined to the exemplifying embodiments illustrated in the figures alone, but different embodiments of the invention can show variation within the scope of the inventive idea defined in the accompanying patent claims.

What is claimed is:

1. In a tubular roll for a paper machine comprising a stationary roll axle, a roll mantle, and hydraulic loading elements and glide bearing elements arranged on said roll axle for supporting said roll mantle on said roll axle, said hydraulic loading elements acting on an inner face of said roll mantle under hydraulic pressure provided by a pressure medium and acting in a principle loading direction, said glide bearing elements being arranged at end areas of said roll and to arranged to act on said inner face of said roll mantle under hydraulic pressure provided by a pressure medium, the improvement comprising:

first duct means for passing a flow of the pressure medium to said glide bearing elements, and second duct means for passing a flow of lubricant to said glide bearing elements, said second duct means being separate from said first duct means such that the flow of lubricant is passed to said glide bearings by said second duct means with a desired pressure and rate irrespective of the flow of the pressure medium to said glide bearing elements via said first duct means.

2. The roll of claim 1, wherein said first duct means comprises a first duct arrange in said roll axle and said second duct means comprises a second duct arranged in said roll axle separate from the first duct.

3. The roll of claim 1, further comprising means for regulating the pressure of the lubricant passing to said glide bearing elements to thereby regulate the flow of the lubricant passing through said glide bearing elements.

4. The roll of claim 1, wherein said second duct means are structured and arranged to feed the lubricant to said glide bearing elements at least one of a substantially constant pressure and a substantially constant flow rate.

5. The roll of claim 1, further comprising means for regulating the flow of the lubricant passing through said glide bearing elements to thereby cool the end areas of said roll mantle.

6. The roll of claim 1, wherein said glide bearing elements are arranged to act in the principal loading direction and in a direction opposite to the principal loading direction.

7. The roll of claim 1, wherein said glide bearing elements are arranged to act in two directions equally angularly offset from the principal loading direction in opposed angular directions and in directions opposite thereto.

* * * * *